United States Patent [19]

Nürnberger

[11] Patent Number: 5,443,279
[45] Date of Patent: Aug. 22, 1995

[54] BICYCLE AND BICYCLE WITH MULTISPEED WHEEL HUB

[75] Inventor: Günter Nürnberger, Schweinfurt, Germany

[73] Assignee: Fichtel & Sachs AG, Schweinfurt, Germany

[21] Appl. No.: 231,308

[22] Filed: Apr. 22, 1994

[30] Foreign Application Priority Data

Apr. 26, 1993 [DE] Germany .......................... 43 13 558.7

[51] Int. Cl.[6] .................. B62M 11/16; B23F 5/22; B23P 13/00
[52] U.S. Cl. ................................. 280/236; 192/6 A; 280/238; 475/289; 475/298
[58] Field of Search ................ 280/236, 238; 475/289, 475/296, 297, 298; 192/6 A

[56] References Cited

U.S. PATENT DOCUMENTS

| | | | |
|---|---|---|---|
| 4,063,469 | 12/1977 | Bergles | 192/6 A |
| 4,099,602 | 7/1978 | Kourbetsos . | |

FOREIGN PATENT DOCUMENTS

| | | | |
|---|---|---|---|
| 1304756 | 9/1961 | France . | |
| 814982 | 8/1951 | Germany . | |
| 1459182 | 1/1969 | Germany . | |
| 3732977 | 4/1989 | Germany | 192/6 A |
| 4142867 | 7/1992 | Germany . | |
| 0277523 | 12/1951 | Switzerland . | |
| 0019986 | of 1914 | United Kingdom . | |
| 2166502 | 5/1986 | United Kingdom . | |

OTHER PUBLICATIONS

Sachs Torpedo Super 7 pp. 27–31.

*Primary Examiner*—Mitchell J. Hill
*Attorney, Agent, or Firm*—Nils H. Ljungman & Associates

[57] ABSTRACT

On a multispeed bicycle wheel hub with a sun and planet gear mechanism having at least two multistage planet wheels, the planet wheels are each constructed of two parts, with a first planet wheel part having a rolling gearing segment forming one planet wheel stage and a clutch gearing segment having a clutch outside circumference gearing, as well as a second planet wheel part having at least one rolling gearing segment, each forming a planet wheel stage, as well as a receptacle opening for the clutch gearing segment of the first planet wheel part, which receptacle opening is equipped with a clutch inside circumference gearing which is engaged in the clutch outside circumference gearing. The second planet wheel part is formed by a sintered part, and the first planet wheel part is formed by a machined part, whereby the clutch outside circumference gearing has the same number of teeth and gear rim orientation as the clutch outside circumference gearing. The invention makes it possible to achieve an precisely specified mutual orientation of the planet wheel stages with low manufacturing costs.

20 Claims, 4 Drawing Sheets

BICYCLE AND BICYCLE WITH MULTISPEED WHEEL HUB

BACKGROUND OF THE INVENTION

1. Field of the Invention

This invention generally relates to a multi-stage or multi-speed planet wheel of a sun and planet gear mechanism having at least two planet wheels, in particular for a bicycle wheel hub.

2. Background Information

Such bicycle wheel hubs with multi-stage planet sun and planet gear mechanisms are disclosed, for example, in United Kingdom Patent No. 21 66 502 B, Federal Republic of Germany Patent No. 814 982, Federal Republic of Germany Laid Open Patent Application No. 41 42 867A1. The individual speeds of the planetary gear are generally selected by momentarily fixing one of the sun wheels, which sun wheels are always engaged with the planet wheels on the stationary hub axle, while the other sun wheels remain free to rotate. An additional shifting capability is frequently created by optionally coupling the planet wheel carrier, generally corresponding to high gears or speeds, or the ring gear, generally corresponding to low gears or speeds, are coupled to the driving toothed wheel of the planetary gear, so that, accordingly, a two-stage planetary gear makes available two high speeds and two low speeds. Frequently, there is also a direct speed, so that a total of five speeds are available. In the case of a three-stage planetary gear, there are accordingly seven speeds.

In conventional planetary transmissions, at least three planet wheels are generally used, to achieve a uniform distribution of force. Low manufacturing costs are important, in particular when the planetary gear is used in a mass-produced item such as a bicycle wheel hub. At the same time, care must be taken to achieve sufficient mechanical strength and the least possible wear. These requirements can be met by using sintered moldings. Sintered moldings are manufactured using non-cutting methods, by compressing metal powder at high temperatures, and they tend not to require any finishing operations. If necessary, the material can also be hardened. But there are limitations with regard to the shapes which can be molded, above all because the powder primary materials are pressed inside the mold by the dies which are opposite one another, and are moved toward one another during the molding operation, essentially only in the axial direction. Any shoulders on the mold which project radially inward can have an adverse effect on the compression process. Other shaping methods, e.g. powder metallurgy, injection molding or lost-wax or precision casting, are generally too expensive for mass-produced items such as bicycle wheel hubs.

This is also true for potential manufacturing methods which utilize machining operations. On account of the different number of teeth of the planet wheel stages, in connection with the mold gate required for each stage, the economical cutting processes, e.g. cutting with a solid cylindrical milling cutter, are practically out of the question. The manufacture of the multi-stage planet wheel by a numerically-controlled slotting machine is of course possible in itself, but again it is too expensive.

Making the planet wheel in several parts tends not to be coherent with the objective of economical manufacture, because it should generally be absolutely guaranteed that all the planet wheels of the planetary transmission have as close to exactly the same orientation of the gear teeth of the two parts relative to one another as possible. Otherwise there can be deformations inside the planetary transmission, since the planet wheels are essentially constantly engaged in the common ring gear and in the common sun wheels. It should generally therefore be expected that when the planet wheels are designed as two-piece parts, some measures have to be taken to guarantee the substantially exact mutual angular orientation of the two parts when they are joined. But that, in turn, is generally not coherent with the objective of the most economical manufacturing process possible.

OBJECT OF THE INVENTION

The object of the invention is to create a multi-speed bicycle wheel hub with a sun and planet gear mechanism, having at least two multi-stage planet wheels, whereby the planet wheels can be manufactured economically.

SUMMARY OF THE INVENTION

The invention teaches that this object can be achieved if the multi-stage planet wheels each preferably comprise:

a first planet wheel part;
a first planet wheel part with a gearing segment forming a planet wheel stage and a clutch gearing segment with a clutch outside circumference gearing, and
a second planet wheel part with at least one gearing segment forming a planet wheel stage and an opening to hold the clutch gearing segment of the first planet wheel part, which opening has a clutch inside circumference gearing which is preferably engaged with the clutch outside circumference gearing, whereby the rolling gearing and the clutch outside circumference gearing of the first planet wheel part can preferably have the same number of teeth and gear rim orientation, and whereby the second planet wheel part is formed by a sintered molding.

Since the first planet wheel part preferably has only one planet wheel stage, the clutch outside circumference gearing can be easily manufactured by economical cutting, for example, with a cylindrical milling cutter or by profile milling. Since the clutch outside circumference gearing can preferably have the same tooth pitch and gear rim orientation as the planet wheel stage, both gearings can preferably be manufactured using a single tool and a single setup. This can reduce the manufacturing costs and can also achieve an essentially exact or identical gear rim orientation of rolling gearing and clutch outside circumference gearing. The latter is important for the precise angular assembly of the two parts of the planet wheels.

The second part of the planet wheel is preferably formed by a sintered molding, which has both the rolling gearing segment of the at least one planet wheel stage, as well as the clutch inside circumference gearing. The angular orientation of the gear rims of the planet wheel stages and the clutch inside circumference gearing is usually unnecessary if the manufacturing is consistently performed with the same high precision, since this precision can preferably be achieved by one and the same pressing die. Both parts can therefore be assembled in virtually any position or orientation with respect to one another, and the gear rims of the planet wheel stages of the assembled planet wheel essentially always have the same relative orientation.

It is also conceivable that the clutch outside circumference gearing and the rolling gearing of the first planet wheel part can be manufactured by gearing the cylindrical blank over its entire length with a continuous gearing, and then partly dressing the gearing, except for the clutch gearing segment to form the clutch outside circumference gearing. The result of such a process would typically be that the tip circle diameter of the clutch inside circumference gearing would be essentially equal to the root circle diameter of the rolling gearing, and would thus be relatively large. That could possibly result in an insufficient wall thickness of the sintered part, i.e. the second planet wheel part, since the arc diameter, and thus also the root circle diameter, of the planet wheel stage on the first planet wheel part would most likely not ascend, increase, or match sufficiently to or with the subsequent planet wheel stage on the second planet wheel part. To make possible a greater minimum wall thickness of the second planet wheel part, the invention teaches that the clutch outside circumference gearing can preferably have a smaller root circle diameter than the rolling gearing of the first planet wheel part, and that the tooth shape of the clutch outside circumference gearing corresponds essentially to a cut-off tooth shape of the rolling gearing of the first planet wheel part with a cylindrical interface area concentric to the axis of the planetary wheel.

The clutch outside circumference gearing can therefore preferably be manufactured in a simple manner, by first producing the rolling gearing of the first planet wheel part, for example, in a single setup with the same tool, and then, after reducing the distance between the tool and the axis of the first planet wheel part, manufacturing the clutch outside circumference gearing. Previously or subsequently, the first planet wheel part can preferably be partly dressed, except for the rolling gearing, to obtain the shortened tooth shape of the clutch outside circumference gearing. The cylindrical interface area of the root circle diameter of the clutch outside circumference gearing of the first planet wheel part then preferably defines the root circle diameter and also the tip circle diameter of the clutch inside circumference gearing of the second planet wheel part, the tooth shape of which inside circumference gearing is essentially the same as the space shape of the clutch outside circumference gearing.

In one preferred embodiment of the invention, the first planet wheel part can preferably have a centering segment with a cylindrical outside circumference surface between the rolling gearing segment and the clutch gearing segment, with a diameter which can preferably correspond to the tip circle diameter of the clutch outside circumference gearing. The cylindrical outside circumference surface of the first planet wheel part can preferably be in contact with a cylindrical inside circumference surface of the receptacle opening of the second planet wheel part. The centering segment can essentially guarantee an absolutely zero-play seating between the two planet wheel parts. The centering segment can be easily produced during the manufacturing process by moving the tool, for example a milling cutter, after the runout from the rolling gearing with a constant distance from the axis of the planet wheel part beyond the centering segment, and preferably only then toward the axis of the planet wheel to manufacture the clutch outside circumference gearing. The diameter of the cylindrical outside circumference surface of the centering segment can thereby preferably be somewhat smaller than the root circle diameter of the rolling gearing. The cylindrical outside circumference surface is preferably manufactured by the partial dressing of the first planet wheel part, either before or after the milling of the teeth.

The second planet wheel part as a simple sintered molding can preferably be formed by two segments having different wall thicknesses, since the two pressing dies of the pressing mold are essentially always able to shape one of the two segments. The sintered molding can therefore preferably have two planet wheel stages. Preferably, the sintered part has the planet wheel stage with the largest number of teeth and also the intermediate planet wheel stage. This construction can preferably result in a compact, material-conserving construction, since the first planet wheel part to be inserted in the second planet wheel part can preferably have the planet wheel stage with the smallest diameter.

The sintered part, i.e. the second planet wheel part, can also be manufactured with sufficient wall strength, since the smallest outside diameter of the second planet wheel part is preferably defined by the intermediate planet wheel stage, and not by the smallest planet wheel stage. The invention also teaches that the teeth of the clutch inside circumference gearing have rounded, preferably essentially cylindrically rounded tooth surfaces. The shape of these tooth surfaces can preferably correspond to the shape of the tooth spaces of the clutch outside circumference gearing of the first planet wheel part. This tooth shape is preferably smooth and can achieve reliable transmission of torque between the two planet wheel parts.

The present invention also generally relates to a multi-stage planet wheel of a planetary transmission in a bicycle wheel hub with at least two multi-stage planet wheels. The present invention further relates to a process for the manufacture of a multi-stage planet wheel or a sun and planet gear mechanism having at least two multi-stage planet wheels in a multi-speed bicycle wheel hub.

One aspect of the present invention resides broadly in a wheel hub for a multi-speed bicycle, the wheel hub comprising: at least one sun gear; at least one ring gear; at least two planet gear wheels; the at least two planet gear wheels comprising: a first planet gear wheel having a first longitudinal axis; a second planet gear wheel having a second longitudinal axis; the first planet gear wheel comprising: a first gearing segment; a clutch segment; the clutch segment comprising a first plurality of projections projecting outwardly from the first longitudinal axis and the clutch segment further comprising spaces between ones of said first plurality of projections; the second planet gear wheel comprising: at least one second gearing segment; an opening for receiving the clutch segment of the first planet gear wheel; the opening comprising a second plurality of projections projecting inwardly toward the second longitudinal axis and the opening further comprising spaces between ones of the second plurality of projections; the first plurality of projections and the spaces of the clutch segment of the first planet gear wheel being configured to engage with the second plurality of projections and the spaces of the opening of the second planet gear wheel; at least one of the first planet gear wheel and the second planet gear wheel having means for moving the first planet gear wheel and the second planet gear wheel with respect to one another to engage the first planet gear wheel and the second planet gear wheel with one another, and to disengage the first planet gear wheel and the second planet gear wheel with one another; means for connecting spokes to the wheel hub; sprocket means for connecting a bicycle chain to the wheel hub; shifter means for shifting gears in the wheel hub; and means for connecting the shifter means to a manual shifter on a bicycle remote from the wheel hub.

Another aspect of the invention resides broadly in a method of making and operating a wheel hub for a multi-speed bicycle comprising: at least one sun gear; at least one ring gear; at least two planet gear wheels; the at least two planet gear wheels comprising: a first planet gear wheel having a first longitudinal axis; a second planet gear wheel having a second longitudinal axis; the first planet gear wheel comprising: a first gearing segment; a clutch segment; the clutch segment comprising a first plurality of projections projecting outwardly from the first longitudinal axis and the clutch segment further comprising spaces between ones of the first plurality of projections; the second planet gear wheel comprising: at least one second gearing segment; an opening for receiving the clutch segment of the first planet gear wheel; the opening comprising a second plurality of projections projecting inwardly toward the second longitudinal axis and the opening further comprising spaces between ones of the second plurality of projections; the first plurality of projections and the spaces of the clutch segment of the first planet gear wheel being configured to engage with the second plurality of projections and the spaces of the opening of the second planet gear wheel; at least one of the first planet gear wheel and the second planet gear wheel having means for moving the first planet gear wheel and the second planet gear wheel with respect to one another to engage the first planet gear wheel and the second planet gear wheel with one another, and to disengage the first planet gear wheel and the second planet gear wheel with one another; means for connecting spokes to the wheel hub; sprocket means for connecting a bicycle chain to the wheel hub; shifter means for shifting gears in the wheel hub; and means for connecting the shifter means to a manual shifter on a bicycle remote from the wheel hub; the method comprising the steps of: providing at least one sun gear; providing at least one ring gear; providing at least two planet gear wheels; the step of providing at least two planet gear wheels comprising: providing a first planet gear wheel having a first longitudinal axis; providing a second planet gear wheel having a second longitudinal axis; the step of providing the first planet gear wheel comprising: providing a first gearing segment; providing a clutch segment; the providing of the clutch segment comprising providing a first plurality of projections projecting outwardly from the first longitudinal axis and the providing of the clutch segment further comprising providing spaces between ones of the first plurality of projections; the step of providing the second planet gear wheel comprising: providing at least one second gearing segment; providing an opening for receiving the clutch segment of the first planet gear wheel; the step of providing the opening comprising providing a second plurality of projections projecting inwardly toward the second longitudinal axis and the step of providing the opening further comprising providing spaces between ones of the second plurality of projections; providing means for connecting spokes to the wheel hub; providing sprocket means for connecting a bicycle chain to the wheel hub; providing shifter means for shifting gears in the wheel hub; providing means for connecting the shifter means to a manual shifter on a bicycle remote from the wheel hub; the method further comprising the steps of: forming on the clutch segment a first plurality of projections projecting outwardly from the first longitudinal axis and forming on the clutch segment spaces between ones of the first plurality of projections; forming in the opening a second plurality of projections projecting inwardly toward the second longitudinal axis and forming in the opening spaces between ones of the second plurality of projections; aligning the first and the second longitudinal axes; and moving at least one of the first planet gear wheel and the second planet gear wheel with respect to one another along one of the first and second longitudinal axes and engaging the outwardly projecting first plurality of projections and the spaces of the clutch segment of the first planet gear wheel with the inwardly projecting second plurality of projections and the spaces of the opening of the second planet gear wheel; and moving at least one of the first planet gear wheel and the second planet gear wheel with respect to one another along one of the first and second longitudinal axes and disengaging the outwardly projecting first plurality of projections and the spaces of the clutch segment of the first planet gear wheel from the inwardly projecting second plurality of projections and the spaces of the opening of the second planet gear wheel.

BRIEF DESCRIPTION OF THE DRAWINGS

This invention is explained below in greater detail with reference to a preferred embodiment illustrated in the accompanying figures, in which.

DESCRIPTION OF THE PREFERRED EMBODIMENT

Figure 1:
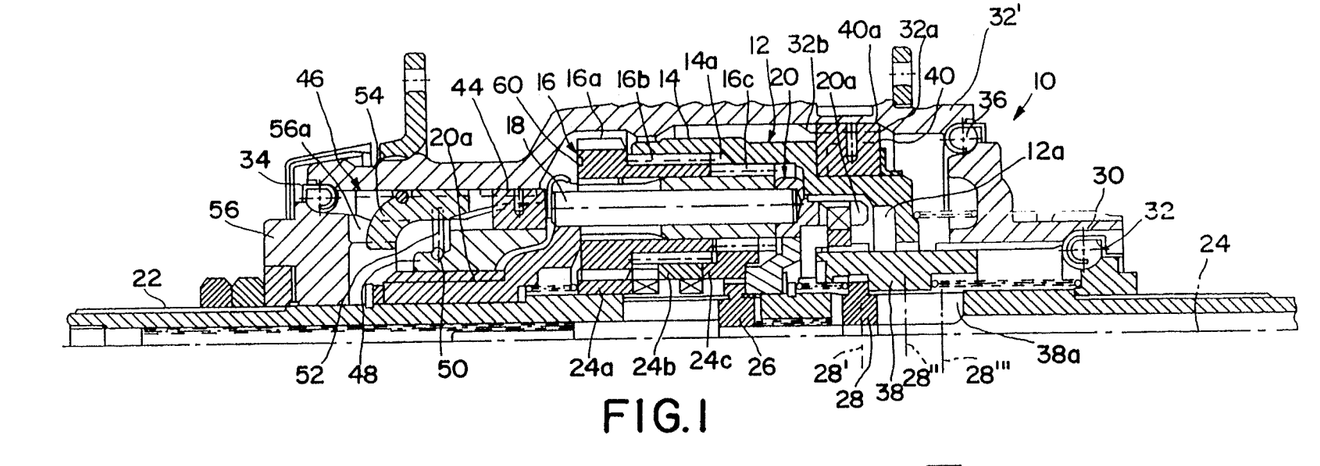
FIG. 1 shows a longitudinal section through a multi-speed bicycle wheel hub having a two-piece planet wheel.

The multi-speed bicycle wheel hub 10 illustrated in a simplified longitudinal section in FIG. 1 has, as its "core", a sun and planet gear mechanism 12, which makes the required gear ratios available by upshifting (to higher speeds) and downshifting (to lower speeds).

The sun and planet gear mechanism 12 preferably has a ring gear 14. The inside circumference gearing 14a of the ring gear 14 is preferably continuously engaged with planet wheels 16, of which there are at least two in each planetary transmission, for a balance of forces and for self-centering. In the normal case, there preferably are three planet wheels 16. The planet wheels 16 can preferably be mounted by means of bearing bolts 18 on a common planet wheel carrier 20 so that they can rotate. The cage-like planet wheel carrier 20 is preferably mounted by means of a bearing segment 20a so that it can rotate on a stationary hub axle 22. The longitudinal axis of the hub axle 22 can preferably define an axis of rotation 24 of the bicycle wheel hub 10, around which the moving parts of the bicycle wheel hub 10 can rotate.

The planet wheels 16 are preferably designed in three stages with a large planet wheel stage 16a having the maximum number of teeth, an intermediate planet wheel stage 16b having an intermediate number of teeth, and a small planet wheel stage 16c having the lowest number of teeth. The intermediate planet wheel stage 16b is preferably continuously engaged with the ring gear 14. All of the stages of the planet wheel, i.e. 16a, 16b, and 16c are preferably continuously engaged with corresponding sun wheels 24a, 24b and 24c.

By means of a pawl 26, which pawl 26 can be moved parallel to the axis of rotation 24, one of the sun wheels 24a, 24b, 24c can be selected and fixed in a non-rotating manner on the hub axle 22. The pawl 26 is preferably connected (in a manner not shown) to a manual shifting mechanism 109 (see FIGS. 6 and 7) on the bicycle handlebars 108. A second pawl 28 which is also connected to the manual shifting mechanism 109 is preferably used to switch among three different force paths from a driver 30, supporting a sprocket wheel (not shown in FIG. 1), to a hub sleeve 32', to which are attached the bicycle spokes for the bicycle rim. The driver 30 is preferably mounted by means of a ball bearing 32 on the hub axle 22. The hub sleeve 32' is preferably mounted on one end by means of a ball bearing 34 on the hub axle 22, and on the other end by means of a ball bearing 36 preferably on the driver 30.

In the left end position of second pawl 28, designated 28' in FIG. 1, the force path can preferably run from the driver 30 by means of a clutch ring 38 with clutch gearing 38a, to a corresponding clutch gearing 20a of the planet wheel carrier 20. The planet wheel carrier 20 can, in turn, drive, by means of the planet wheels 16, the ring gear 12, and namely with a translation ratio which is preferably determined by the currently fixed sun wheel 24a to 24c. A freewheel clutch in the form of a locking pawl 40 essentially makes certain that the hub sleeve 32' moves along with the ring gear 12. The high gear with the highest transmission ratio (7th gear) is preferably selected by fixing the largest sun wheel 24c. The 6th and 5th gears are preferably selected by fixing the sun wheel 24b or the sun wheel 24a, respectively.

By shifting the pawl 28 into an intermediate position designated 28", the clutch ring 38 will essentially be moved to the right as shown in FIG. 1, whereby the clutch gearing 38a is preferably disengaged from the clutch gearing 20a of the planet wheel carrier 20, but is preferably still engaged with a corresponding clutch gearing 12a of the ring gear 12. The result is the direct 4th gear, in which the force flows via the clutch ring 38 to the ring gear 12, and via the pawl coupling 40 preferably to the hub sleeve 32'.

As a result of further shifting of the pawl 28 into the right limit position designated 28''' in FIG. 1, the ring gear 12 with the clutch ring 38 is pushed to the right. Consequently, the pawl coupling is deactivated, since the pawls 40a are pivoted radially inward as a result of a deflector surface 32a on the inside circumference of the hub sleeve 32', and are thus disengaged from the radially inwardly projecting clutch projections 32b of the hub sleeve 32'.

The force now flows from the driver 30 via the clutch ring 38 to the ring gear 12, and from the latter via the planet wheels 16 rolling on one of the sun wheels 24a to 24c to the planet wheel carrier 20. Its rotation is transmitted by an additional pawl coupling 44 to the hub sleeve 32'. This pawl coupling 44 is also overtaken in 7th, 6th and 5th gears by the more rapidly rotating hub sleeve 32'.

The rider can downshift (when travelling uphill), and in particular can downshift the least amount by activating the sun wheel 24a. Preferably, this minimal shifting would correspond to 3rd gear. The rider can downshift an intermediate amount by activating the sun wheel 24b, and by the maximum amount when the sun wheel 24c is activated. Preferably, the intermediate shifting would correspond to 2nd gear, and the maximal shifting would correspond to 1st gear.

In all the gears, a braking device 46 makes possible an immediate deceleration of the hub sleeve 32' when the rider backpedals. For this purpose, a brake activation piece 48 is preferably mounted by means of a coarse screw thread 50 on the segment 20a of the planet wheel carrier 20. When the rider backpedals, a stationary prestressed spring 52 engaged with the brake part 48 can essentially guarantee that the brake part 48 is temporarily not co-rotating, and thus moves to the left in FIG. 1 toward brake jaws 54 on account of the coarse screw thread. Corresponding angled surfaces on the brake activation part 48 and on the brake jaws 54 are pressed radially outward to make braking contact against the inside circumference surface of the hub sleeve 32'. Holding lugs 56a on a hub flange 56 attached in a nonrotating manner to the hub axle 22 prevent co-rotation of the brake jaws 54.

In a known manner, a series of prestress springs (not shown) preferably guarantee the return of the corresponding parts to their initial position.

On the multi-speed bicycle wheel hub 10 as a massproduced product, the economical manufacture of all the parts and their reliable operation are both important. With regard to the planet wheels 16, it is of particular importance that the rolling gearings of the planet wheel stages 16a, 16b and 16c have a precisely specified gear rim orientation relative to one another so that, while retaining a uniform initial orientation, all three planet wheels 16 of the planetary transmission 12 can be assembled preferably without forcing any of the teeth.

Figure 2:
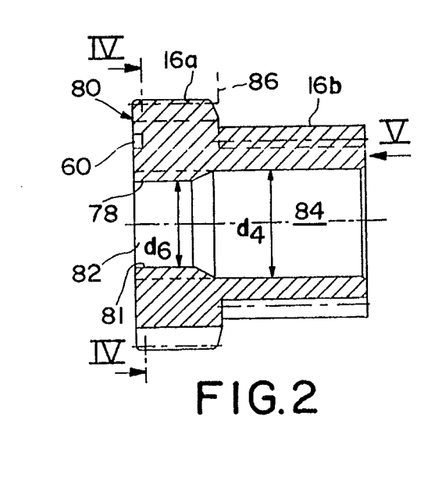
FIG. 2 shows an enlarged longitudinal section through one of the two parts of the planet wheel.
Figure 4:
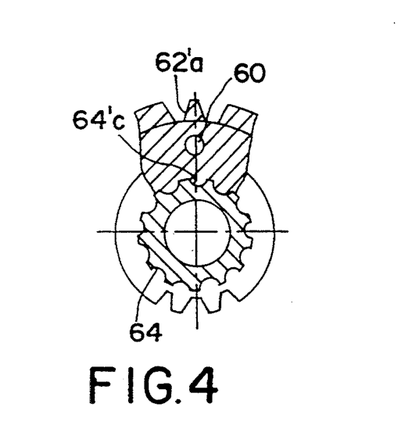
FIG. 4 shows a cross section of the pieces of the assembled planet wheel taken along lines IV—IV in FIGS. 2 and 3.
Figure 5:
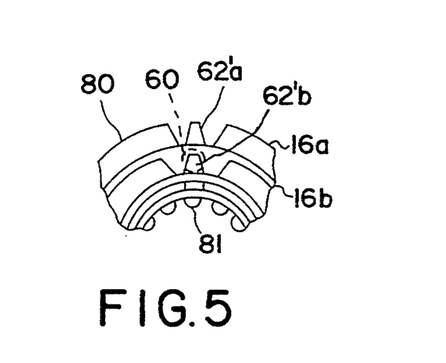
FIG. 5 shows a side view of the part of the planet wheel illustrated in FIG. 2, from direction V.

The initial orientation of a planet wheel 16 can be marked by a recess 60 on the left end surface in FIG. 1, which recess 60 is also indicated in FIGS. 2 and 4. The angular orientation of the gear rim of the planet wheel stages 16a, 16b and 16c can be defined, for example, so that in the angular position corresponding to the marking recess 60, the corresponding tooth 62a' of the gear rim of the planet wheel stage 16a lies precisely in the same angular position as the corresponding tooth 62b' of the planet wheel stage 16b. On the other hand, as shown in FIG. 4, a tooth space 64c' of the gear rim of the planet wheel stage 16c lies precisely in the abovementioned angular position, defined by the marking recess 60.

This specified orientation of the gear rims of the planet wheel stages 16a, 16b and 16c relative to one another can thus be reliably maintained in spite of the two-piece design of the planet wheel 16, as shown from the following remarks.

Figure 3:
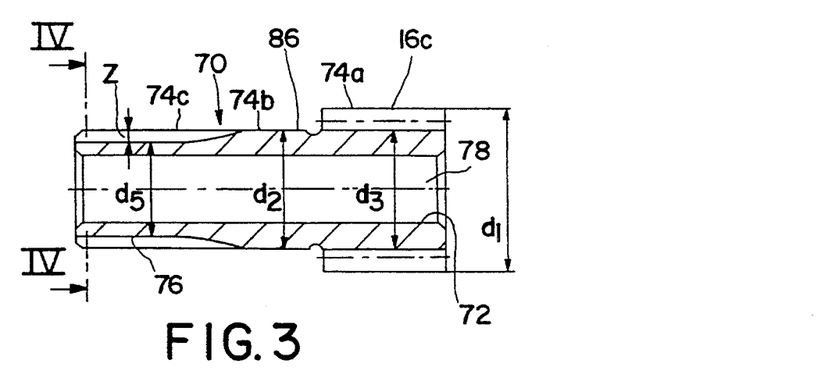
FIG. 3 shows an enlarged longitudinal section through the first part of the other part of the planet wheel.

With reference to FIG. 3, a first part 70 of the two parts of the planet wheel is preferably designed as a steel part, which is preferably machined by removing metal. The unfinished product is a steel sleeve with a hole 72 corresponding to the outside diameter of the bearing bolt 18. The outside diameter of the steel sleeve preferably corresponds to the desired tip circle diameter d1 of the gearing of the planet wheel stage 16c. Then, except for a terminal segment 74a which later forms the planet wheel stage 16c, the sleeve is preferably machined to a diameter d2 which can preferably be slightly smaller than the root circle diameter d3 of the subsequently machined gearing of the planet wheel stage 16c.

Using the same setup, with further reference to FIG. 3, the gearing of the planet wheel stage 16c can now be cut, along with a clutch outside circumference gearing 76, preferably in a single operating process-using an appropriate milling cutter or other suitable tool. For this purpose, the milling cutter, after the runout from the segment 74a, is preferably moved farther to the left relative to the workpiece, along an intermediate segment 74b, without changing the distance of the cutter from the axis 78 of the workpiece. Since the diameter d2 of this segment 74b is slightly smaller than the root circle diameter d3, the cutter is temporarily not engaged in the workpiece. Only after it reaches a terminal segment 74c (the axial length of which can be approximately one-half of the axial length of the work piece) is the cutter moved toward the axis 78, so that the cutter is engaged in the material of the workpiece. But the depth of penetration of the cutter, which preferably defines the tooth height Z of the clutch outside circumference gearing 76, is preferably less than the tooth height ($=0.5 \times [d1-d3]$) of the planet wheel stage 16c, since there is preferably only a form-fitting engagement between the clutch outside diameter gearing 76 and a corresponding clutch inside diameter gearing 78 of the second planet wheel part 80. Since the clutch outside circumference gearing 76 and the planet wheel stage 16c are preferably manufactured using one cutter and one tool setup, precisely the same angular orientation of the two gear rims can be essentially guaranteed in advance.

Further, in accordance with one preferable method, the milling cutter, or other suitable cutting device, can have a projection for cutting the slot or space between the individual gear teeth of the planet wheel stage 16c and the gear teeth of the clutch gearing 76. According to this method, the spaces between the gear teeth or splines of the clutch gearing 76 would preferably be cut after the teeth of planet wheel stage 16c were cut, as described above. The probable result would be that the spaces between the gear teeth of the planet wheel stage 16c and the spaces between the gear teeth or splines of the clutch gearing 76 would preferably be substantially aligned. Further, since the diameter d5 of the clutch gearing 76 is substantially less than the diameter of the root circle diameter d3 of the planet wheel stage 16c, the teeth of the clutch gearing 76 would probably not be as wide as the gear teeth of the planet wheel stage 16c.

Alternatively, in accordance with an additional preferable method, the milling cutter, or other suitable cutting device, can have a projection for cutting the teeth of the planet wheel stage 16c and the teeth of the clutch gearing 76. According to this method, the teeth of the clutch gearing 76 would preferably be cut after the teeth of the planet wheel stage 16c were cut, as described above. The probable result would be that the teeth of the planet wheel stage 16c and the teeth of the clutch gearing 76 would preferably be substantially aligned. As also discussed above, due to the differences in the diameters d5 and d3, the spaces between the teeth of the clutch gearing 76 would probably not be as wide as the spaces between the teeth of the planet wheel stage 16c.

In other words, and in accordance with one preferred embodiment of the present invention, the wheel hub further comprises one of the following sets of characteristics a) and b):

a) each one of the plurality of teeth of the clutch segment comprise a first and second side disposed circumferentially from one another;

the first side comprises a first point and the second side comprises a second point, the first and second points being disposed at predetermined positions on the first side and the second side of each one of the plurality of teeth of the clutch segment;

each one of the plurality of teeth of the first gearing segment comprise a third and fourth side disposed circumferentially from one another;

the third side comprises a third point and the fourth side comprises a fourth point, the third and fourth points each disposed at a position corresponding to the first and second points of the plurality of teeth of the clutch segment;

the first point is in alignment with the third point and the second point is in alignment with the fourth point; and b) each one of the spaces of the clutch segment comprise a fifth and sixth side disposed circumferentially from one another;

the fifth side comprises a fifth point and the sixth side comprises a sixth point, the fifth point and the sixth points each disposed at predetermined positions on the fifth side and the sixth side of each one of the spaces of the clutch segment;

each one of the spaces of the plurality of teeth of the first gearing segment comprise a seventh and eighth side disposed circumferentially from one another;

the seventh side comprises a seventh point and the eighth side comprises an eighth point, the seventh and eighth points each disposed at a position corresponding to the fifth and sixth points of the spaces of the clutch segment; and the fifth point is in alignment with the seventh point and the sixth point is in alignment with the eighth point.

The second part 80 of the planet wheel is preferably a sintered part, the shape of which can be reproduced essentially exactly by the sintering press mold, so that here too, an exact observance of the relative gear rim orientation of the gear rims of the two planet wheel stages 16a and 16b and of the above mentioned clutch inside circumference gearing 78 is essentially guaranteed. The teeth 81 of the clutch inside circumference gearing 78 correspond precisely, in terms of their shape, to the spaces between the teeth of the clutch outside circumference gearing 76. Since these spaces between teeth, i.e. roots, are essentially curved in the shape of a hollow cylinder, the tips of the teeth 82 are preferably correspondingly cylindrically curved. The root circle diameter d5 of the clutch outside circumference gearing 76 can essentially equal the tip circle diameter d6 of the clutch inside circumference gearing 78.

Figure 2A:
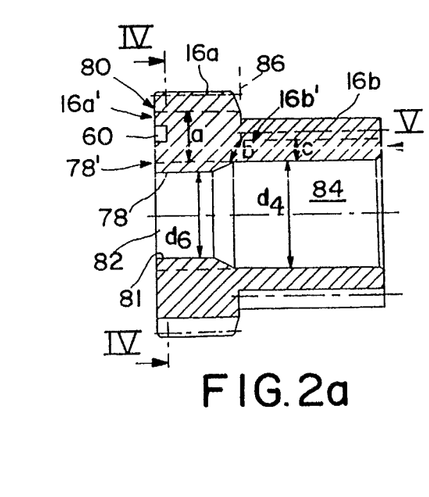
FIG. 2a shows substantially the same view as FIG. 2, but shows additional features.

The second part 80 of the planet wheel is preferably formed by sintering, as discussed above, primarily due to the complex shape of part 80. The internal gearing 78 and the steps of the planet stages 16a and 16b can contribute to this complex shape. Sintering part 80 thus would most likely be less expensive than if part 80 were machined from one solid piece of metal. However the strength of part 80 may often be compromised by sintering. The strength of part 80 may often be less than the strength of part 70, which part 70 is preferably formed by machining from a solid piece of metal. As shown in FIG. 2a, the walls of sintered part 80 can be manufactured to have sufficient thickness, as indicated by a, b, and c, preferably in order to withstand a force exerted by part 70 when the two parts 80 and 70 are pushed together, or engaged with one another. Thus, even though part 80 may not be as strong as part 70, the wall thicknesses of part 80, as indicated by a, b, and c, could be made large enough to adequately withstand, with minimal damage or deformation, any forces resulting from the engagement of parts 70 and 80. Thus, dimension "a" preferably represents the thickness or distance between the roots 16a' of the gear teeth of the planet stage 16a and the roots 78' of the gear teeth of the internal clutch gearing or splines 78. Further, dimension "b" preferably represents the diagonal thickness or distance between the roots 16b' of the gear teeth of the planet stage 16b and the roots 78' of the gear teeth of the internal clutch gearing or splines 78 at the side nearest opening 84. Finally, dimension "c" preferably represents the thickness or distance between the roots 16b' of the gear teeth of the planet stage 16b and the roots 78' of the gear teeth of the planet stage 16b at a distance axially away from dimension "b".

Figure 3A:
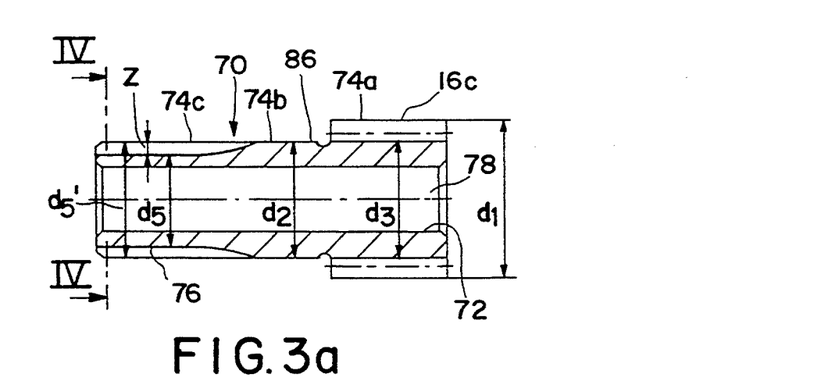
FIG. 3a shows substantially the same view as FIG. 3, but shows additional features.

Thus, by reducing the root circle diameter d5 and also the tip circle diameter d5' (see FIG. 3a) of segment 74c of part 70, the wall thicknesses, a,b, and c, of part 80 can preferably be increased, thereby increasing the strength of part 80 overall. Further, preferably, only an end portion of part 70, i.e. gearing 76, engages with the clutch gearing or splines 78 of part 80, which can also make more space available for increasing the wall thicknesses, a, b, and c, of part 80.

The clutch inside gearing 78 is preferably part of a receptacle opening 82 which runs through the planet wheel part 80. The axial length of this receptacle opening 82 is preferably equal to the axial length of the segments 74c and 74b added together. An additional segment of the receptacle opening 82 adjacent to the segment with the clutch inside gearing 78 has a cylindrical inside circumference surface 84 having a diameter d4 which preferably essentially equals the diameter d2 of the segment 74b of the part 70.

The two parts 70 and 80 can therefore be assembled (e.g. if necessary, they can be shrunk on one another), to thereby preferably obtain a mechanically solid connection between the two parts 70 and 80. The clutch gearings 76 and 78 therefore can preferably maintain a specified relative rotational orientation of the two parts 70 and 80 in relation to one another. The segment 74b with its cylindrical outside circumference surface 86 is preferably in tight contact with the inside circumference surface 84, so that there can essentially be no relative movement between the two parts 70 and 80.

Thus, conceivably, the two parts 70 and 80 can be redesigned and manufactured in accordance with the present invention, so that costs are minimized. However, the two parts 70 and 80 can still preferably be utilized with standard multi-speed hubs of bicycles. For example, the ring gear or gears 14 are typically of a common or standard size in the bicycle industry. Therefore, the two parts 70 and 80, redesigned in accordance with the present invention, will preferably be able to work or operate in conjunction with standard size ring gears 14.

In other words, parts 70 and 80 can be redesigned so that they can be made less expensively, without having to redesign the other parts of a standard multi-speed hub. By changing parts 70 and 80 only, the hub can preferably be made more economically.

In spite of its ease of manufacture, the precision of the angular orientation of the planet wheel stages can therefore be sufficient, because on one hand the angular orientation of the clutch outside circumference gearing 76, on account of the milling work, which can preferably be performed in a single process and in a single setup, is essentially the same as the angular orientation of the planet wheel stage 16c. On the other hand, during the pressing of the sintered molding to manufacture the part 80, the mold core which forms the inside circumference surface 84 is preferably held precisely in the desired orientation relative to the mantle forming the planet wheel stages 16a and 16b, in particular by means of a stationary mandrel which preferably penetrates the two press dies, which can preferably be designed as hollow cylinders. After the metal powder is charged into the sintering mold, the two dies are preferably moved toward one another in the axial direction, compressing the sintering powder, so that the powder grains move toward one another from both sides toward the radial plane 86 formed between the two planet wheel stages 16a and 16b in the transitional area. The result is a correct compression of the powder, even in the vicinity of the shoulder between the two planet wheel stages 16a and 16b. During or after the pressing, the part is preferably sintered, i.e. heated to slightly below the melting temperature of the principal components of the powder under a cover gas or in a vacuum.

Both parts 70 and 80 can be hardened before being assembled, if necessary.

The gearing mechanisms of the present invention may conceivably be assembled using electronic/electrical machine assembly methods as discussed in "Robots and Manufacturing Automation" by Asfahl, published by Wiley & Sons. Pages 268-9 of the aforementioned publication discuss a method of assembling and mating spur gears which may be used to assemble components of the present invention. The aforementioned publication, "Robots and Manufacturing Automation", is hereby incorporated by reference as if set forth in its entirety herein.

Figure 6:
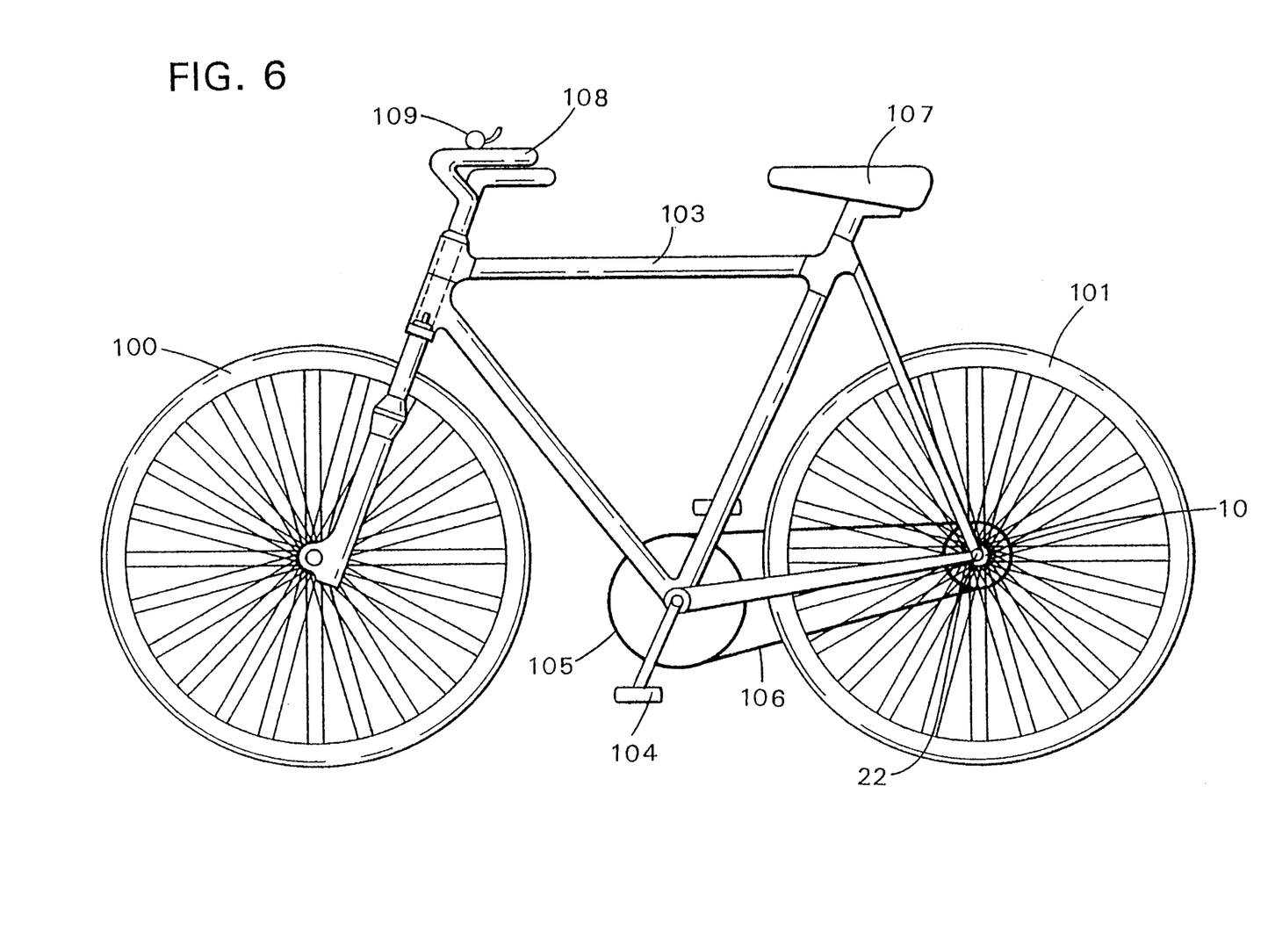
FIG. 6 shows an overall view of a typical multi-speed bicycle.

FIG. 6 shows a typical multi-speed bicycle having a front wheel 100 and a rear wheel 101. The wheels 100 and 101 are preferably attached to a frame 103. Movement of a pulley-like chain and pedal system causes the rear wheel 101 to rotate. In other words, the pedals 104 are preferably attached to the hub of a sprocket 105, the outside of which sprocket 105 preferably engages a chain 106. The chain 106 is preferably also engaged with the rear wheel hub 10. The forward rotation of the rear wheel 101 sets the front wheel 100 into synchronous motion.

A seat 107, attached to frame 103, is preferably provided for the comfort of the rider of the bicycle. Handlebars 108 are also provided for steering purposes, and a manual shifting device 109 is provided for shifting from low to high gears and vice versa. The manual shifting device 109, when adjusted by the rider, preferably triggers a gear change in the vicinity of the hub 10 by means of cables (see FIG. 7).

Figure 7:
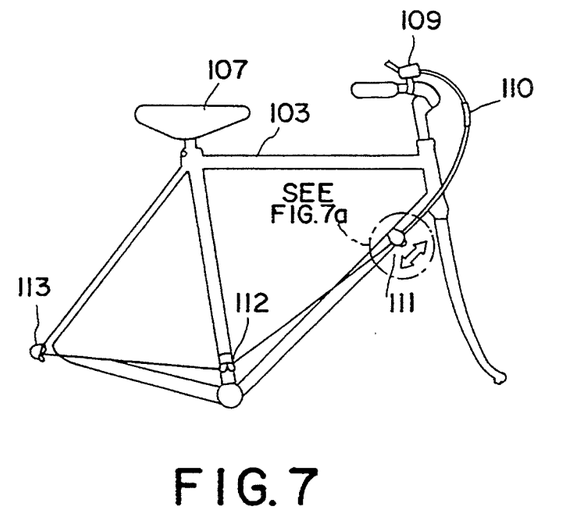
FIGS. 7 and 7a show control details of a typical multi-speed bicycle.
Figure 7A:
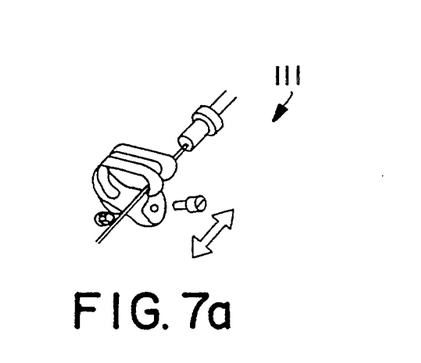

FIGS. 7 and 7a show typical control details for a bicycle for shifting from low to high gears and vice versa. The manual shifting mechanism 109 is preferably operatively attached to a cable or cables 110 which can be fastened to the frame 103 of the bicycle at location 111 (shown in further detail in FIG. 7a), or another suitable location which would preferably not interfere with the operation of the bicycle. The cable or cables 110 are then preferably led by a guide 112 towards location 113, at which location 113 the cable or cables 110 can be operatively attached near the hub 10 (not shown in FIGS. 7 and 7a), by means of a connection (not shown).

One feature of the invention resides broadly in the multispeed bicycle wheel hub 10 with a sun and planet gear mechanism 12 having at least two multispeed planet wheels 16, wherein the planet wheels 16 each comprise:
  a first planet wheel part 70 with a rolling gearing segment segment 74a forming a planet wheel stage 16c and a clutch gearing segment having a clutch outside circumference gearing 76; and
  a second planet wheel part 80 with at least one rolling gearing segment, each segment forming a planet wheel stage 16a, 16b as well as a receptacle opening 82 for the clutch gearing segment of the first planet wheel part 70, which receptacle opening 82 has a clutch inside circumference gearing 78 which engages the clutch outside circumference gearing 76,
whereby the rolling gearing and the clutch outside circumference gearing 76 of the first planet wheel part 70 have the same number of teeth and gear rim orientation, and whereby the second planet wheel part 80 is formed by a sintered part.

Another feature of the invention resides broadly in the multispeed bicycle wheel hub characterized by the fact that the clutch outside circumference gearing 76 has a smaller root circle diameter d5 than the rolling gearing d3, and that the tooth shape of the clutch outside circumference gearing 76 is essentially the same as the cut-off tooth shape of the rolling gearing with a cylindrical interface area concentric to the planet wheel axis 78.

Yet another feature of the invention resides broadly in the multispeed bicycle wheel hub characterized by the fact that the first planet wheel part 70 between the rolling gearing segment segment 74a and the clutch gearing segment segment 74c has a centering segment segment 74b with a cylindrical outside circumference surface 86 having a diameter d2 which corresponds to the tip circle diameter of the clutch outside circumference gearing 76, and that a cylindrical inside circumference surface 84 of the receptacle opening 82 of the second planet wheel part 80 is in contact with the outside circumference surface 86.

Still another feature of the invention resides broadly in the multispeed bicycle wheel hub characterized by the fact that on a three-stage planet wheel 16, the second planet wheel part 80 has the planet wheel stage 16a with the greatest number of teeth and the intermediate planet wheel stage 16b.

Another feature of the invention resides broadly in the multispeed bicycle wheel hub characterized by the fact that the teeth 81 of the clutch inside circumference gearing 78 have rounded tooth tips.

Yet another feature of the invention resides broadly in the multispeed bicycle wheel hub characterized by the fact that the tooth tips are essentially rounded cylindrically.

Still another feature of the invention resides broadly in the multispeed planet wheel 16 of a sun and planet gear mechanism 12 having at least two multi-stage planet wheels 16 in a multispeed bicycle wheel hub 1, comprising:
  a first planet wheel part 70 with a rolling gearing segment segment 74a forming a planet wheel stage 16c and a clutch gearing segment having a clutch outside circumference gearing 76; and
  a second planet wheel part 80 with at least one rolling gearing segment, each forming a planet wheel stage 16a, 16b as well as a receptacle opening 82 for the clutch outside circumference 76 of the first planet wheel part 70, which receptacle opening 82 has a clutch inside circumference gearing 78 engaged in the clutch outside circumference gearing 76, whereby the rolling gearing and the clutch outside circumference gearing 76 of the first planet wheel part 70 have the same number of teeth and gear rim orientation, and whereby the second planet wheel part 80 is formed by a sintered part.

Another feature of the invention resides broadly in the process for the manufacture of a multistage planet wheel 16 for a sun and planet gear mechanism 12 in a multispeed bicycle wheel hub 10 having at least two multistage planet wheels 16, whereby:
  a first planet wheel part 70 is manufactured by a metal-removing process with a rolling gearing segment segment 74a forming a planet wheel stage 16c, and a clutch gearing segment having a clutch outside circumference gearing 76, whereby the rolling gearing and the clutch outside circumference gearing 76 have the same number of teeth and gear rim orientation, and
  a second planet wheel part 80 is manufactured as a sintered part with at least one rolling gearing segment, each segment forming a planet wheel stage 16a, 16b and a receptacle opening 82 for the clutch gearing segment of the first planet wheel part 70, which receptacle opening 82 has a clutch inside circumference gearing 78 which fits the clutch outside circumference gearing 76, and
  the two planet wheel parts 70, 80 are joined together.

Yet another feature of the invention resides broadly in the process characterized by the fact that the first planet wheel part 70 is manufactured in a single setup using the same milling tool.

Still another feature of the invention resides broadly in the process characterized by the fact that the clutch outside circumference gearing 76 of the first planet wheel part 70 is manufactured with a smaller radial distance of the milling cutter from the planet wheel axis than the rolling gearing of the planet wheel stage 16 of the first planet wheel part 70.

A further feature of the invention resides broadly in the process characterized by the fact that during the manufacture of the first planet wheel part 70, the latter is machined in stages, with a terminal segment 74a of larger diameter forming the rolling gearing segment, as well as a segment intermediate segment 74b and terminal segment 74c in FIG. 3 having a smaller diameter, the diameter d2 of which is smaller than the root circle diameter d3 of the rolling gearing of the planet wheel stage 16c.

Types of transmissions for bicycles, which may be utilized in accordance with the embodiments of the present invention may be disclosed in the following U.S. Pat. No. 3,944,253 to Ripley on Mar. 16, 1976, entitled "Infinitely Variable Transmission for Pedal-Driven Vehicles"; U.S. Pat. No. 4,973,297 to Bergles on Nov. 27, 1990, entitled "Multispeed Drive Hub With More Than Three Speeds"; U.S. Pat. No. 4,721,015 to Hartmann on Jan. 26, 1988, entitled "Three Stage Planetary Driving Wheel for Pedal Powered Vehicles"; and U.S. Pat. No. 4,063,469 to Bergles on Dec. 20, 1977, entitled "Multiple Speed Hub for a Vehicle Wheel".

Types of devices and methods, which may be employed for forming various gearing components of the present invention, may be disclosed in the following U.S. Pat. No. 5,033,239 to Phillips on Jul. 23, 1991, entitled "Disposable Hob and Method of Grinding Same"; U.S. Pat. No. 4,750,848 to Adler on Jun. 14, 1988, entitled "Involute Gear Cutter"; and U.S. Pat. No. 4,663,721 to Herscovici on May 5, 1987, entitled "Gear Cutter".

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if any, described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. P 43 13 558.7, filed on Apr. 26, 1993, having inventor Günter Nürnberger and DE-OS P 43 13 558.7 and DE-PS P 43 13 558.7, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A wheel hub for a multi-speed bicycle, said wheel hub comprising:
   at least one sun gear;
   at least one ring gear;
   a first planet gear wheel having a first longitudinal axis;
   a second planet gear wheel having a second longitudinal axis;
   said first planet gear wheel comprising:
     a first gearing segment;
     a clutch segment;
     said clutch segment comprising a first plurality of projections projecting outwardly from said first longitudinal axis and said clutch segment further comprising spaces between ones of said first plurality of projections;
   said second planet gear wheel comprising:
     at least one second gearing segment;
     an opening for receiving said clutch segment of said first planet gear wheel;
     said opening comprising a second plurality of projections projecting inwardly toward said second longitudinal axis and said opening further comprising spaces between ones of said second plurality of projections;
   said first planet gear wheel and said second planet gear wheel comprising at least two planet gear wheels;
   said first plurality of projections and said spaces of said clutch segment of said first planet gear wheel being configured to engage with said second plurality of projections and said spaces of said opening of said second planet gear wheel;
   at least one of said first planet gear wheel and said second planet gear wheel having means for moving said first planet gear wheel and said second planet gear wheel with respect to one another to engage said first planet gear wheel and said second planet gear wheel with one-another, and to disengage said first planet gear wheel and said second planet gear wheel with one another;
   said wheel hub further comprising:
   means for connecting spokes to said wheel hub;
   sprocket means for connecting a bicycle chain to said wheel hub;
   shifter means for shifting gears in said wheel hub; and
   means for connecting said shifter means to a manual shifter on a bicycle remote from said wheel hub.

2. The wheel hub according to claim 1 wherein said second planet gear wheel has been formed by sintering.

3. The wheel hub according to claims 1 wherein said first planet gear wheel has a first main body portion;
   said first plurality of projections of said clutch segment comprise a plurality of teeth projecting outwardly from said first main body portion of said first planet gear wheel;
   ones of said plurality of teeth of said clutch segment have roots and terminal ends disposed away from said roots;
   said roots of said clutch segment are disposed at said first main body portion;
   said roots of said clutch segment have a first diameter;
   said first gearing segment comprises a plurality of teeth projecting outwardly from said first main body portion;
   said first gearing segment further comprises a plurality of spaces disposed between ones of said plurality of teeth of said first gearing segment, ones of said plurality of teeth of said first gearing segment having roots and terminal ends disposed away from said roots;

said roots of said first gearing segment are disposed at said first main body portion;

said roots of said first gearing segment have a second diameter; and said first diameter is substantially smaller than said second diameter.

4. The wheel hub according to claim 3 wherein said terminal ends of said clutch segment have a third diameter;

said terminal ends of said first gearing segment have a fourth diameter; and said third diameter is substantially smaller than said fourth diameter.

5. The wheel hub according to claim 4 further comprising one of the following characteristics a) and b):
 a) ones of said plurality of teeth of said first gearing segment are substantially in alignment with ones of said plurality of teeth of said clutch segment; and
 b) ones of said plurality of spaces of said first gearing segment are substantially in alignment with ones of said plurality of spaces of said clutch segment.

6. The wheel hub according to claim 5, further comprising one of the following sets of characteristics a) and b):
 a) each one of said plurality of teeth of said clutch segment comprise a first and second side disposed circumferentially from one another;
 said first side comprises a first point and said second side comprises a second point, said first and second points being disposed at predetermined positions on said first side and said second side of each one of said plurality of teeth of said clutch segment;
 each one of said plurality of teeth of said first gearing segment comprise a third and fourth side disposed circumferentially from one another;
 said third side comprises a third point and said fourth side comprises a fourth point, said third and fourth points each disposed at a position corresponding to said first and second points of said plurality of teeth of said clutch segment;
 said first point is in alignment with said third point and said second point is in alignment with said fourth point; and
 b) each one of said spaces of said clutch segment comprise a fifth and sixth side disposed circumferentially from one another;
 said fifth side comprises a fifth point and said sixth side comprises a sixth point, said fifth point and said sixth points each disposed at predetermined positions on said fifth side and said sixth side of each one of said spaces of said clutch segment;
 each one of said spaces of said plurality of teeth of said first gearing segment comprise a seventh and eighth side disposed circumferentially from one another;
 said seventh side comprises a seventh point and said eighth side comprises an eighth point, said seventh and eighth points each disposed at a position corresponding to said fifth and sixth points of said spaces of said clutch segment; and
 said fifth point is in alignment with said seventh point and said sixth point is in alignment with said eighth point.

7. The wheel hub according to claim 6 wherein: said second planet gear wheel further comprises:
 a second main body portion;
 at least two second gearing segments;
 said at least two second gearing segments are axially disposed from one another;
 each one of said at least two second gearing segments comprises a plurality of teeth extending outwardly from said second main body portion;
 ones of said plurality of teeth of each one of said at least two second gearing segments have roots and terminal ends disposed away from said roots;
 said roots of each of said at least two second gearing segments are disposed at said second main body portion;
 said second plurality of projections of said opening comprise a plurality of teeth extending inwardly from said second main body portion;
 ones of said plurality of teeth of said opening have roots and terminal ends disposed away from said roots;
 said roots of said opening are disposed at said second main body portion;
 said roots of said plurality of teeth of one of said at least two second gearing segments have a fifth diameter;
 said roots of said plurality of teeth of said opening have a sixth diameter;
 said roots of said plurality of teeth of the other one of said at least two second gearing segments have a seventh diameter;
 said opening further comprises an inner surface disposed axially away from said plurality of teeth of said opening, said inner surface having an eighth diameter; and
 said third diameter of said terminal ends of said plurality of teeth of said clutch segment comprising a minimum dimension to maximize the difference between said fifth and sixth diameters, and to maximize the difference between said seventh and eighth diameters, to thus maximize the strength of said second planet gear wheel.

8. The wheel hub according to claim 7 wherein said first planet gear wheel further comprises:
 a cylindrical centering segment extending between said clutch segment and said first gearing segment;
 said centering segment has a ninth diameter;
 said ninth diameter is substantially similar to said third diameter of said clutch segment.

9. The wheel hub according to claim 8 wherein said inner surface of said opening of said second planet gear wheel is disposed to be in contact with said centering segment of said first planet gear wheel upon engagement of said first planet gear wheel and said second planet gear wheel.

10. The wheel hub according to claim 9 wherein said second planet gear wheel has been formed by sintering.

11. The wheel hub according to claim 10 wherein:
 ones of said plurality of teeth of said opening of said second planet gear wheel comprise a cylindrically rounded shape;
 said first gearing segment has substantially the same number of teeth as said clutch segment;
 one of said at least two second gearing segments has a greater number of teeth than said first gearing segment and a greater number of teeth than the other one of said at least two second gearing segments;
 said at least one ring gear is configured to be in substantially continuous engagement with said at least two planet gear wheels;
 said wheel hub further comprises:

a carrier comprising a clutch gearing;

bearing bolt means for mounting said at least two planet wheels on said carrier and for permitting said at least two planet wheels to rotate;

a stationary hub axle having a third longitudinal axis;

bearing means for mounting said carrier on said hub axle and for permitting said carrier to rotate;

said first gearing segment of said first planet gear wheel is configured to have a lesser number of teeth than said at least two second gearing segments;

said at least one sun-gear comprising at least three sun gears each corresponding to said first gearing segment and said at least two second gearing segments;

said at least two second gearing segments and said first gearing segment are configured to be in substantially continuous engagement with corresponding ones of said at least three sun gears;

said wheel hub further comprises:

first pawl means for selecting one of said at least three sun wheels and for fixing one of said at least three sun wheels in a substantially non-rotating manner on said hub axle;

said first pawl means is operatively connected to said manual shifter;

second pawl means for selecting one of three force paths, said second pawl means is operatively connected to said manual shifter for selecting one of at least three force paths;

said second pawl means is configured to have at least a first, second, and a third predetermined axial position;

driver means for supporting said sprocket means;

first ball bearing means for mounting said driver means on said hub axle;

said means for connecting spokes comprises a hub sleeve having two ends;

said wheel hub further comprises:

second ball bearing means for mounting one of said ends of said hub sleeve on said hub axle;

third ball bearing means disposed on said driver means for mounting the other one of said ends of said hub sleeve on said hub axle;

a clutch ring having a clutch gearing configured for directing a force along one of said at least three force paths when said second pawl means is in one of said first, second and third predetermined positions;

a locking pawl configured for moving said hub sleeve along with said at least one ring gear;

said clutch gearing of said clutch ring is engaged with said clutch gearing of said carrier when said second pawl is in said first predetermined position;

said clutch gearing of said clutch ring is disengaged with said clutch gearing of said carrier when said second pawl is in said second predetermined position;

said at least one ring gear comprises:

at least one clutch gearing; said clutch gearing of said clutch ring is engaged with a corresponding one of said at least one clutch gearing of said at least one ring gear when said second pawl is in said second predetermined position;

said wheel hub further comprises:

at least one pawl coupling;

said hub sleeve further comprises:

a plurality of inwardly projecting clutch projections;

said at least one ring gear and said clutch ring are engaged with one another when said second pawl is in said third predetermined position;

said wheel hub further comprises:

braking means for permitting deceleration of said hub sleeve when the rider backpedals;

said braking means comprises:

a braking activation piece mounted on said carrier;

a spring configured to be engaged with said braking activation piece;

brake jaws;

said braking activation piece and said brake jaws having corresponding angled surfaces;

said wheel hub further comprises:

a hub flange;

at least one lug;

said hub flange is attached in a non-rotating manner to said hub axle by said at least one lug;

said second planet gear wheel further comprises:

a recess;

said recess is configured for defining the angular orientation of said at least two second gearing segments and said first gearing segment with respect to one another.

12. A method of making and operating a wheel hub for a multi-speed bicycle comprising: at least one sun gear; at least one ring gear; a first planet gear wheel having a first longitudinal axis; a second planet gear wheel having a second longitudinal axis; the first planet gear wheel comprising: a first gearing segment; a clutch segment; the clutch segment comprising a first plurality of projections projecting outwardly from the first longitudinal axis and the clutch segment further comprising spaces between ones of the first plurality of projections; the second planet gear wheel comprising: at least one second gearing segment; an opening for receiving the clutch segment of the first planet gear wheel; the opening comprising a second plurality of projections projecting inwardly toward the second longitudinal axis and the opening further comprising spaces between ones of the second plurality of projections; the first planet gear wheel and the second planet gear wheel comprising at least two planet gear wheels; the first plurality of projections and the spaces of the clutch segment of the first planet gear wheel being configured to engage with the second plurality of projections and the spaces of the opening of the second planet gear wheel; at least one of the first planet gear wheel and the second planet gear wheel having means for moving the first planet gear wheel and the second planet gear wheel with respect to one another to engage the first planet gear wheel and the second planet gear wheel with one another, and to disengage the first planet gear wheel and the second planet gear wheel with one another; means for connecting spokes to the wheel hub; sprocket means for connecting a bicycle chain to the wheel hub; shifter means for shifting gears in the wheel hub; and means for connecting the shifter means to a manual shifter on a bicycle remote from the wheel hub; said method comprising the steps of:

providing at least one sun gear;

providing at least one ring gear;

providing a first planet gear wheel having a first longitudinal axis;

providing a second planet gear wheel having a second longitudinal axis;
said step of providing the first planet gear wheel comprising:
providing a first gearing segment;
providing a clutch segment;
said step of providing the second planet gear wheel comprising:
providing at least one second gearing segment;
providing an opening for receiving the clutch segment of the first planet gear wheel;
configuring the first planet gear wheel and the second planet gear wheel to comprise at least two planet gear wheels;
providing means for connecting spokes to the wheel hub;
providing sprocket means for connecting a bicycle chain to the wheel hub;
providing shifter means for shifting gears in the wheel hub;
providing means for connecting the shifter means to a manual shifter on a bicycle remote from the wheel hub;
said method further comprising the steps of:
forming on the clutch segment a first plurality of projections projecting outwardly from the first longitudinal axis and forming on the clutch segment spaces between ones of the first plurality of projections;
forming in the opening a second plurality of projections projecting inwardly toward the second longitudinal axis and forming in the opening spaces between ones of the second plurality of projections;
aligning the first and the second longitudinal axes; and
moving at least one of the first planet gear wheel and the second planet gear wheel with respect to one another along one of the first and second longitudinal axes and engaging the outwardly projecting first plurality of projections and the spaces of the clutch segment of the first planet gear wheel with the inwardly projecting second plurality of projections and the spaces of the opening of the second planet gear wheel; and
moving at least one of the first planet gear wheel and the second planet gear wheel with respect to one another along one of the first and second longitudinal axes and disengaging the outwardly projecting first plurality of projections and the spaces of the clutch segment of the first planet gear wheel from the inwardly projecting second plurality of projections and the spaces of the opening of the second planet gear wheel.

13. The method according to claim 12, said method further comprising the steps of:
said step of providing the first planet gear wheel comprises forming the first planet gear wheel by means of a sole cutting means;
forming the plurality of teeth and spaces of the first gearing segment of the first planet gear wheel by means of the cutting means;
providing a cylindrical centering segment extending between the clutch segment and the first gearing segment;
forming the centering segment of the first planet gear wheel by reducing the radial distance of the milling cutter from the first longitudinal axis;
forming the plurality of teeth and spaces of the clutch segment of the first planet gear wheel by again reducing the radial distance of the milling cutter from the first longitudinal axis.

14. The method according to claim 13 wherein said step of providing the second planet gear wheel comprises forming the second planet gear wheel by a sintering process.

15. The method according to claim 14 wherein said step of forming the plurality of teeth on the clutch segment further comprises:
providing terminal ends and roots, the terminal ends being disposed away from the roots;
said step of providing roots comprises:
providing a first diameter;
said step of forming the plurality of teeth on the first gearing segment further comprises:
providing terminal ends and roots, the terminal ends being disposed away from the roots;
said step of providing roots comprises:
providing a second diameter, the second diameter being substantially smaller than the first diameter.

16. The method according to claim 15 wherein said step of providing terminal ends of the clutch segment comprises:
providing a third diameter;
said step of providing said terminal ends of the first gearing segment comprises:
providing a fourth diameter, the third diameter being substantially smaller than the fourth diameter.

17. The method according to claim 16 wherein said method further comprises one of the following steps:
a) substantially aligning ones of the plurality of teeth of the first gearing segment with ones of the plurality of teeth of the clutch segment; and
b) substantially aligning ones of the plurality of spaces of the first gearing segment with ones of the plurality of spaces of the clutch segment.

18. The method according to claim 17 wherein said method further comprises one of the following sets of steps a) and b):
a) said step of providing of each one of said plurality of teeth of said clutch segment comprises providing a first and second side disposed circumferentially from one another;
said step of providing the first side comprises providing a first point and said step of providing the second side comprises providing a second point, the first and second points being disposed at predetermined positions on the first side and the second side of each one of the plurality of teeth of the clutch segment;
said step of providing of each one of the plurality of teeth of the first gearing segment comprises providing a third and fourth side disposed circumferentially from one another;
said step of providing the third side comprises providing a third point and said step of providing the fourth side comprises providing a fourth point, the third and fourth points each being disposed at a position corresponding to the first and second points of the plurality of teeth of the clutch segment;
aligning the first point with the third point and aligning the second point with the fourth point; and
b) said providing of each one of the spaces of the clutch segment comprises providing a fifth and sixth side disposed circumferentially from one another;

said step of providing the fifth side comprises providing a fifth point and said step of providing the sixth side comprises providing a sixth point, the fifth point and the sixth points being disposed at predetermined positions on the fifth side and the sixth side of each one of the spaces of the clutch segment;

said step of providing each one of the spaces of the plurality of teeth of the first gearing segment comprises providing a seventh and eighth side disposed circumferentially from one another;

said step of providing the seventh side comprises providing a seventh point and said step of providing the eighth side comprises providing an eighth point, the seventh and eighth points being disposed at a position corresponding to the fifth and sixth points of the spaces of the clutch segment; and aligning the fifth point with the seventh point and aligning the sixth point with the eighth point.

19. The method according to claim 18 wherein:

said step of providing of the second planet gear wheel further comprises:

providing at least two second gearing segments;

disposing the at least two gearing segments axially from one another;

said step of providing the at least two gearing segments comprises providing each one of the at least two second gearing segments with a plurality of teeth extending outwardly from the second longitudinal axis, ones of the plurality of teeth of each one of the at least two second gearing segments having roots and terminal ends;

said step of providing the second plurality of projections of the opening comprises providing a plurality of teeth, ones of the plurality of teeth having roots and terminal ends;

said step of providing roots of the plurality of teeth of one of the at least two second gearing segments comprises providing a fifth diameter;

said step of providing roots of the plurality of teeth of the opening comprises providing a sixth diameter;

said step of providing roots of the plurality of teeth of the other one of the at least two second gearing segments comprises providing a seventh diameter;

said step of providing the opening further comprises providing an inner surface disposed axially away from the plurality of teeth of the opening, the inner surface comprising an eighth diameter;

minimizing the difference between the fifth and sixth diameters and maximizing the difference between the seventh and eighth diameters to thus maximize the strength of the second planet gear wheel, by providing a minimum dimension of the third diameter of the terminal ends of the plurality of teeth of the clutch segment;

said step of providing the centering segment comprises:

providing a ninth diameter, the ninth diameter being substantially similar to the third diameter of the clutch segment;

said step of providing the inner surface of the opening of the second planet gear wheel comprises: disposing the inner surface to be in contact with the centering segment of the first planet gear wheel upon engagement of the first planet gear wheel and the second planet gear wheel.

20. The method according to claim 19 wherein said method further comprises the step of configuring the wheel hub such that:

ones of the plurality of teeth of the opening of the second planet gear wheel comprise a cylindrically rounded shape;

the first gearing segment has substantially the same number of teeth as the clutch segment;

one of the at least two second gearing segments have a greater number of teeth than the first gearing segment and the other one of the at least two second gearing segments;

the at least one ring gear is configured to be in substantially continuous engagement with the at least two planet gear wheels; the wheel hub further comprises:

a carrier comprising a clutch gearing;

bearing bolt means for mounting the at least two planet wheels on the carrier and for permitting the at least two planet wheels to rotate;

a stationary hub axle;

bearing means for mounting the carrier on the hub axle and for permitting the carrier to rotate;

the hub axle having a third longitudinal axis;

the first gearing segment of the first planet gear wheel is configured to have a lesser number of teeth than the at least two second gearing segments;

the at least one sun gear comprising at least three sun gears each corresponding to the first gearing segment and the at least two second gearing segments;

the at least two second gearing segments and the first gearing segment are configured to be in substantially continuous engagement with corresponding ones of the at least three sun gears;

the wheel hub further comprises:

first pawl means for selecting one of the at least three sun wheels and for fixing one of the at least three sun wheels in a substantially non-rotating manner on the hub axle;

the first pawl means is operatively connected to the manual shifter;

second pawl means for selecting one of three force paths, the second pawl means is operatively connected to the manual shifter for selecting one of at least three force paths;

the second pawl means is configured to have at least a first, second, and a third predetermined axial position;

driver means for supporting the sprocket means;

first ball bearing means for mounting the driver means on the hub axle;

the means for connecting spokes comprises a hub sleeve having two ends;

the wheel hub further comprises:

second ball bearing means for mounting one of the ends of the hub sleeve on the hub axle;

third ball bearing means disposed on the driver means for mounting the other one of the ends of the hub sleeve on the hub axle;

a clutch ring having a clutch gearing configured for directing a force along one of the at least three force paths when the second pawl means is in one of the first, second and third predetermined positions;

a locking pawl configured for moving the hub sleeve along with the at least one ring gear;

the clutch gearing of the clutch ring is engaged with the clutch gearing of the carrier when the second pawl is in the first predetermined position;
the clutch gearing of the clutch ring is disengaged with the clutch gearing of the carrier when the second pawl is in the second predetermined position; the at least one ring gear comprises:
at least one clutch gearing;
the clutch gearing of the clutch ring is engaged with a corresponding one of the at least one clutch gearing of the at least one ring gear when the second pawl is in the second predetermined position;
the wheel hub further comprises:
at least one pawl coupling;
the hub sleeve further comprises:
a plurality of inwardly projecting clutch projections;
the at least one ring gear and the clutch ring are engaged With one another when the second pawl is in the third predetermined position;
the wheel hub further comprises:

braking means for permitting deceleration of the hub sleeve when the rider backpedals;
the braking means comprises:
a braking activation piece mounted on the carrier;
a spring configured to be engaged with the braking activation piece;
brake jaws;
the braking activation piece and the brake jaws having corresponding angled surfaces;
the wheel hub further comprises:
a hub flange;
at least one lug;
the hub flange is attached in a non-rotating manner to the hub axle by the at least one lug;
the second planet gear wheel further comprises:
a recess;
the recess is configured for defining the angular orientation of the at least two second gearing segments and the first gearing segment with respect to one another.

* * * * *

UNITED STATES PATENT AND TRADEMARK OFFICE
CERTIFICATE OF CORRECTION

PATENT NO. : 5,443,279
DATED : August 22, 1995
INVENTOR(S) : Günter NÜRNBERGER

It is certified that error appears in the above-indentified patent and that said Letters Patent is hereby corrected as shown below:

On the title page, item [56], after '0019986', delete "of 1914" and insert --5/1914--.

In column 9, line 3, after 'spite', delete "of-the" and insert --of the--.

In column 9, line 23, after 'operating', delete "process-using" and insert --process using--.

In column 16, line 35, Claim 1, after 'with, delete "one-another," and insert --one another,--.

In column 16, line 47, Claim 3, after 'to', delete "claims" and insert --claim--.

In column 19, line 13, Claim 11, after 'one', delete "sun-gear" and insert --sun gear--.

In column 25, line 18, Claim 20, after 'engaged', delete "With" and insert --with--.

Signed and Sealed this

Thirty-first Day of December, 1996

BRUCE LEHMAN

Attest:

*Attesting Officer*  *Commissioner of Patents and Trademarks*